United States Patent [19]

Mirando

[11] Patent Number: 5,411,271
[45] Date of Patent: May 2, 1995

[54] ELECTRONIC VIDEO MATCH GAME

[75] Inventor: Salvatore Mirando, Holmdel, N.J.

[73] Assignee: Coastal Amusement Distributors, Inc., Lakewood, N.J.

[21] Appl. No.: 176,237

[22] Filed: Jan. 3, 1994

[51] Int. Cl.⁶ ............................................. A63F 9/08
[52] U.S. Cl. ................................... 273/434; 273/433; 273/153 R; 273/273; 434/176; 434/333; 434/322; 434/323
[58] Field of Search ........... 273/433, 434, 273, 153 R, 273/272, 237; 434/176, 333, 322, 323

[56] References Cited

U.S. PATENT DOCUMENTS

| | | | |
|---|---|---|---|
| 2,199,499 | 5/1940 | Kreitler | 273/273 |
| 2,835,052 | 5/1958 | Raich et al. | |
| 3,584,398 | 6/1971 | Meyer et al. | |
| 3,710,455 | 1/1973 | Liversidge et al. | |
| 3,876,206 | 4/1975 | Moura | 273/273 |
| 4,228,596 | 1/1980 | Daniel | |
| 4,275,442 | 6/1981 | Underwood et al. | |
| 4,359,220 | 11/1982 | Morrison et al. | 273/273 |
| 4,593,904 | 6/1986 | Graves | |
| 4,648,600 | 3/1987 | Olliges | 273/138 A |
| 4,770,636 | 9/1988 | Buschke | 434/236 |
| 4,829,431 | 5/1989 | Ott et al. | |
| 4,838,551 | 6/1989 | Volpert | 273/157 R |
| 4,863,172 | 9/1989 | Rosenwinkel et al. | 273/153 R X |
| 4,978,302 | 12/1990 | Clossey | |
| 5,122,062 | 6/1992 | Cutler et al. | |
| 5,178,545 | 1/1993 | Thompson | |
| 5,288,075 | 2/1994 | Kelley | 273/243 |

Primary Examiner—Vincent Millin
Assistant Examiner—Kerry Owens
Attorney, Agent, or Firm—Richard C. Woodbridge

[57] ABSTRACT

An electronic video game requires the player to match the location of information on a video screen with the correct location of a pushbutton in a corresponding array. Initially, the video screen produces a display showing nine object character icons located in nine different locations in a tic-tac-toe arrangement. The display is flashed on for a few seconds and then discontinued. Next, the video screen displays one of the characters in a clue box and challenges the player to correctly match the clue character with its previous location on an array of nine pushbuttons laid out in the same tic-tac-toe fashion. The player then chooses one pushbutton corresponding to where the player believed the character had appeared in the original video display. Additional different characters are then displayed on the screen and the player continues to attempt to match the location of the additional characters against nine buttons on the console until either all characters have been successfully identified or the game times out. The game keeps track of the number of matches so that the player receives a score at the end of the game corresponding to his or her total correct guesses. During the next sequence of play, the characters can be randomly reorganized on the video screen so that the locations differ from game to game. It is also possible to use the same character at more than one tic-tac-toe location, if desired.

17 Claims, 12 Drawing Sheets

| | |
|---|---|
| GAME OVER | - WHEN CREDIT = 0 |
| INSERT COIN | - WHILE WAITING FOR COIN IN |
| YOU WIN! | - IF MATCHED ALL 5 |
| TIME'S UP! | - IF TIMER RUNS OUT |
| TRY AGAIN! | - IF LOSE OR NO MATCH |

CURTAIN
1. CLOSED
2. OPENING (2 STEPS)
3. OPEN
4. NUMBERS 1-9
5. VALENCE (FIXED)

LOGO
1. "CUSTOMER MATCH GAME"

MESSAGES
1. GAME OVER
2. INSERT COIN
3. YOU WIN!
4. TIME'S OUT!
5. TRY AGAIN!

TIMER
1. TIME INCREMENT
2. ART
3. MESSAGE
4. ANIMATION

MATCHED BOXES
1. SMALL VERSIONS OF EACH CHARACTER MOVING THROUGH SOME SIMPLE "HAPPY" SEQUENCE
2. EMPTY BOX

CHARACTERS BEHIND CURTAINS

FOR EACH OF THE FIVE:
1. "FRIENDLY" SEQUENCE FOR PREVIEW (? STEPS)
   SMILE, WAVE, NOD, ETC.
2. "HAPPY" SEQUENCE FOR MATCH (? STEPS)
   LIKE #1 BUT MORE SO
3. "SAD" SEQUENCE FOR NO MATCH (? STEPS)
   FROWN, SHAKE HEAD, LOOK OF DISAPPOINTMENT, ETC.

ELECTRONIC VIDEO MATCH GAME

BACKGROUND OF THE INVENTION

1. Field of the Invention

This invention relates to a coupon redemption or arcade video game, in general, and, more specifically to a memory game for matching symbols, briefly displayed on a screen, with their correct relative location on an array of pushbuttons on a console.

2. Description of Related Art

The prior art includes a number of educational devices and games that require the user to exercise memory skills to match clues with correct responses. For example, U.S. Pat. No. 3,584,398 presents a message on a screen which requires the user to enter a correct response on a plurality of keys. The display can be arbitrarily changed by means of a random number generator and a timer may be employed to expedite play. Such devices are known in the educational field. They do not, however, require any skill concerning the location of a correct answer with respect to the location of a clue previously shown on the screen.

A number of other devices, sometimes referred to as cognometers, can be employed to test a user's recall a period of time after a specific message or clue has been presented to the user. A typical prior art cognometer is described in U.S. Pat. No. 4,770,636.

Other prior art devices which require the user to match answers against visual clues are described in U.S. Pat. Nos. 3,978,302; 4,829,431 and 5,122,062.

Some prior art educational devices and games include a timing mechanism to test the user's skill in a shortened time frame. The following patents disclose such devices, even though they are known in other contexts: U.S. Pat. No. 3,710,455; 4,593,904 and 5,178,545.

The laying out of pushbuttons in a tic-tac-toe arrangement is found in certain electronic tic-tac-toe-like games. See, for example, the disclosures in U.S. Pat. Nos. 4,228,596 and 4,275,442. In neither case, however, is the layout of the response buttons coordinated with a display on a video screen.

Finally, the following U.S. Pat. Nos. are cited as being of general interest, but otherwise do not appear to be as relevant to the disclosed invention: 2,835,052; 4,359,220; 4,978,303.

None of the foregoing prior art teaches or suggests a novel educational and entertaining video game in which the player is challenged to match the location of symbols arranged in a tic-tac-toe format on a video screen with pushbuttons laid out in a similar array on a console after the original display has been discontinued.

SUMMARY OF THE INVENTION

Briefly described, the invention comprises an educational and entertaining video match game apparatus and method, in which the player is challenged to match the location of a symbol previously displayed on a CRT screen with the appropriate location on a set of pushbuttons laid out in a corresponding fashion. First, the player activates the machine by depositing a coin. Prior to this time, the machine is in the "attract" mode during which it makes interesting sounds and stimulating CRT images to attract a potential customer. After a few introductory display screens, the player is presented with nine symbols or character objects arranged in a tic-tac-toe fashion. Some of the symbols may be identical or, alternatively, all nine images may all be different. The symbols are displayed on the CRT screen for a short period of time, perhaps 5–10 seconds, after which they disappear. Second, the left hand side of the screen displays one of the symbols or character objects. Third, the player has to push one or more buttons on the console. The nine pushbuttons are laid out in the familiar tic-tac-toe format that mimics the original display on the video screen. The player tries to push the button or buttons that corresponds to the location where the player saw the same symbol or object character located on the CRT tic-tac-toe display. After each selection is made, the player is presented with another symbol or character object which he or she must match on the pushbuttons. The process continues until the player has been presented with all of the symbols, or a timer has timed out. The game automatically keeps track of the number of correct choices and displays those on the video screen. If the player chooses to play again, the symbols or character objects are randomly reorganized in the tic-tac-toe display so that the game is always fresh and challenging. The game is not only entertaining but helps to educate the player to identify the symbols or character objects if he or she sees them again in the future.

These and other features of the present invention may be more fully understood by reference to the following drawings.

DETAILED DESCRIPTION OF THE PREFERRED EMBODIMENT

During the course of this description, like numbers will be used to identify like elements according to the different views that illustrate the invention.

Figure 1:
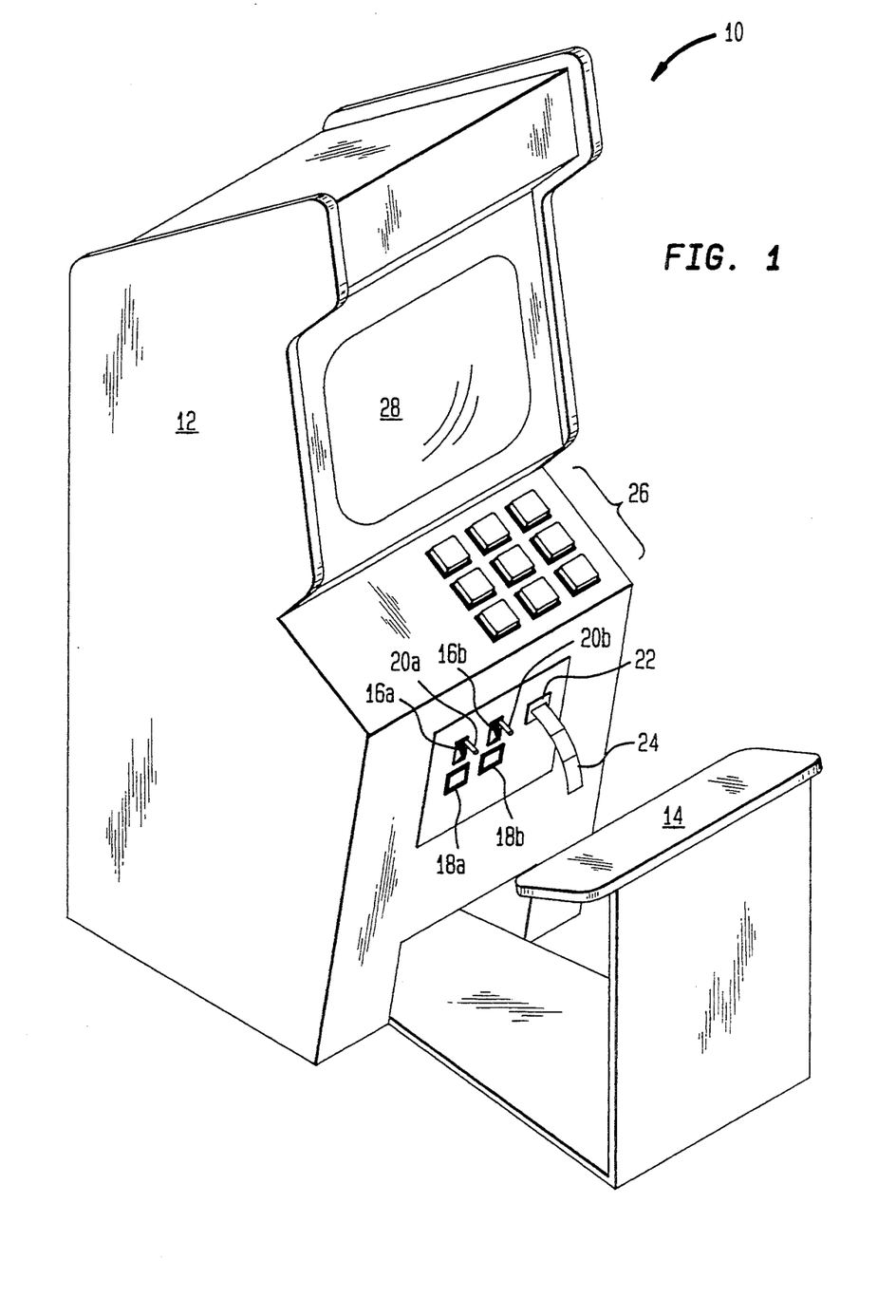
FIG. 1 is a perspective view illustrating the front of the game console according to the preferred embodiment of the present invention.

The preferred embodiment 10 of the invention is illustrated in FIG. 1. A console 12 houses the various components that comprise the video game 10. Video game 10 is preferably a redemption-type of game playable by the insertion of coins or tokens. It might also be found in a conventional video arcade environment. Redemption games typically award the player with tickets or coupons redeemable for prizes. Bench seat 14 permits the player 42 to sit comfortably in front of the console 12 while the game is played.

The game 10 typically operates in an "attract" mode when it is not being played. In the attract mode, an interesting character object or symbol is displayed on the CRT screen 28. Audio sound effects may also be used to entice the potential customer to play the game 10.

The video game 10 is activated by placing a token or coin in either of the coin insertion slots 16a or 16b. Defective coins or tokens are given back to the player 42 at coin return locations 18A and 18B, respectively. Coin return button 20A and 20B can be used to dislodge coins or tokens that hang up in insert slots 16A or 16B. Since video game 10 is typically found in a redemption arcade, the console 12 is equipped with a coupon discharge slot 22 which dispenses coupons 24 in proportion to the winnings of the player 42. Coupons 24 are typically redeemed for prizes after the game is over.

The console 12 is also equipped with pushbuttons 40a-40i organized in a tic-tac-toe-like array 26. Array 26 includes three rows and three columns.

Figure 2:
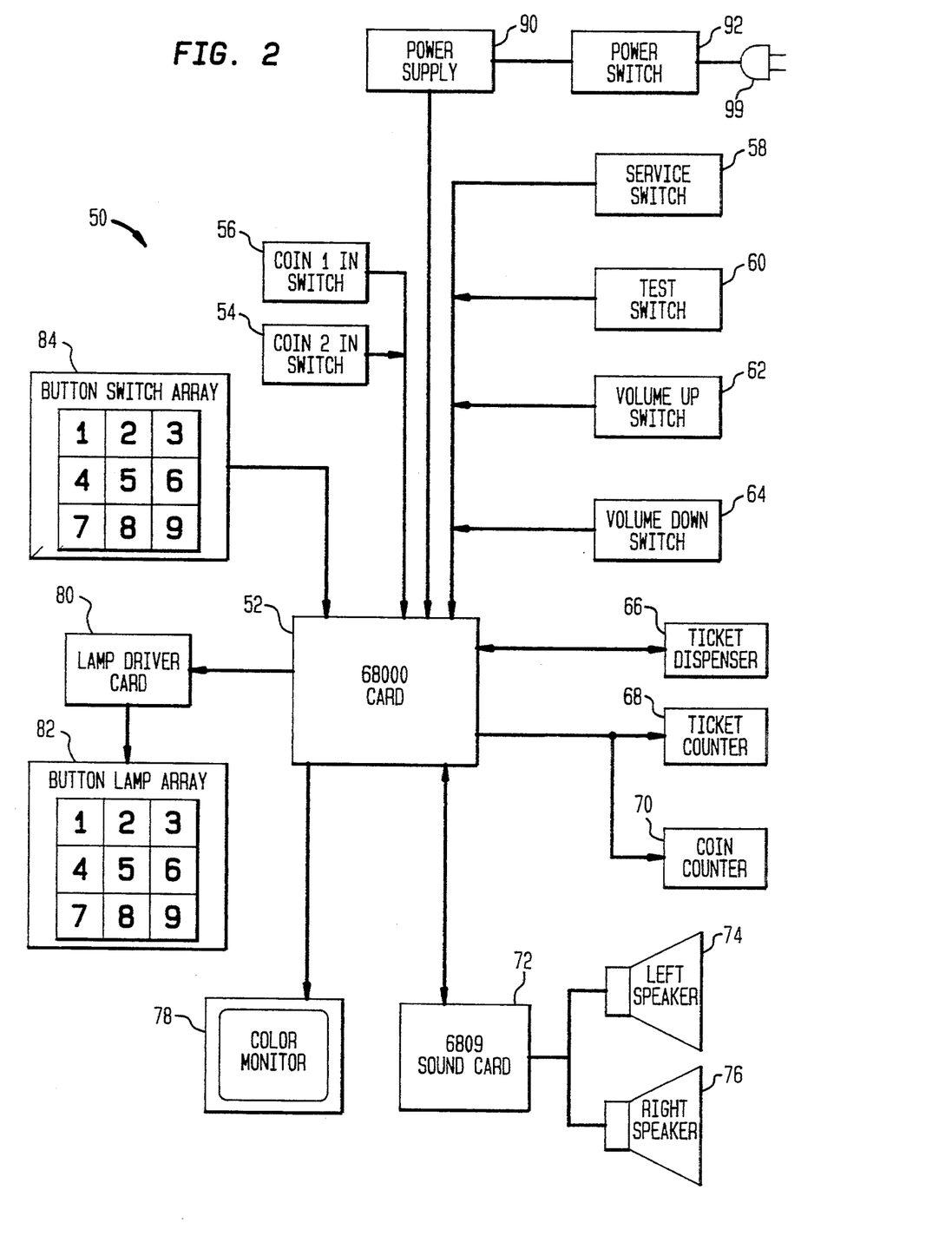
FIG. 2 is an electronic schematic of the present invention illustrated in FIG. 1.

FIG. 2 is an electrical schematic 50 of the basic elements that comprise the invention 10. A Motorola 68000 microprocessor 52 is at the heart of the circuit 50. Play of the game is initiated by placing a coin or token in slot 16A or 16B. That coin is detected by coin switches 54 or 56 which cause the game 10 to leave the attract mode and enter the play mode. Game operation is also controlled by the following external switches: service switch 58, which places the game into a service mode; test switch 60 for testing the machine; volume up switch 62 and volume down switch 64 which respectively control the volume from left speaker 74 and right speaker 76.

Microprocessor 52 also controls ticket dispenser 66, ticket counter 68 and coin counter 70. Ticket counter 68 and coin counter 70 respectively keep track of the total number of tickets or coupons dispensed and the number of coins received. Therefore, at the end of the day, the redemption center or video arcade operator has a good idea of the profitability of the machine.

Left and right speakers 74 and 76 are driven by a 6809-based sound card 72 which in turn is controlled by 68000-based microprocessor 52. The machine 10 is capable of producing both music and voice throughout the play of the game. Color monitor 78 corresponds to the CRT video screen 28 illustrated in FIG. 1. Pushbutton switch array 84 is located underneath the button array 26. It provides an input to the microprocessor card 52 after object FIGS. 36a-36i have been displayed on the video screen 28 of color monitor 78. The individual pushbuttons 40a-40i, shown, for example, in FIG. 3D, are illuminated by the button lamp array 82 which is driven by lamp driver card 80 which, in turn, is controlled by the microprocessor card 52. Power is applied to the game 10 from a line plug 99, through a power on/off switch 90, to a power supply 92. FIG. 2 illustrates the electrical/mechanical schematic of the invention 10 whose operation can now be better understood by reference to FIGS. 3A-4H.

Figure 3A:
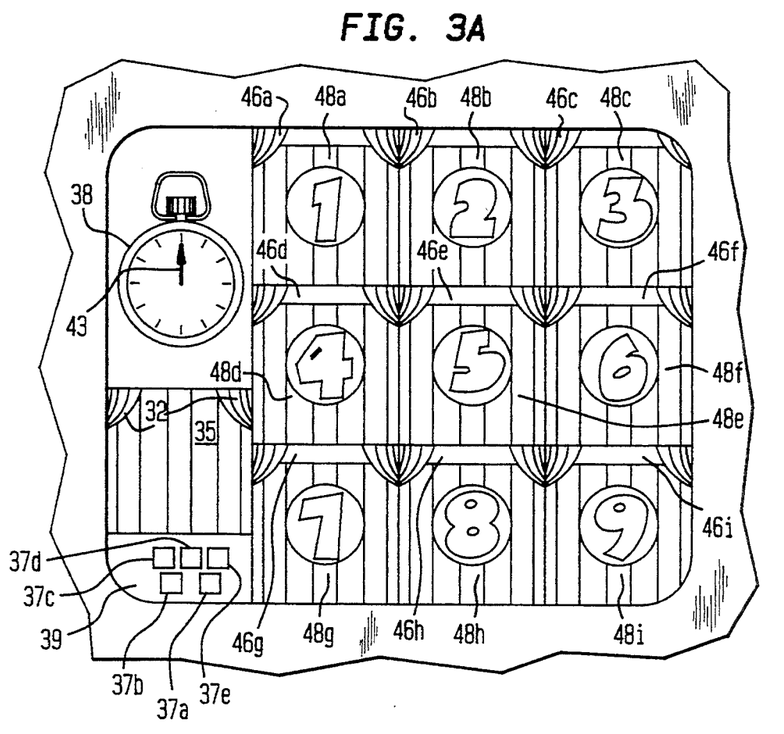
FIG. 3A illustrates the general layout of the main video game screen.
Figure 4A:
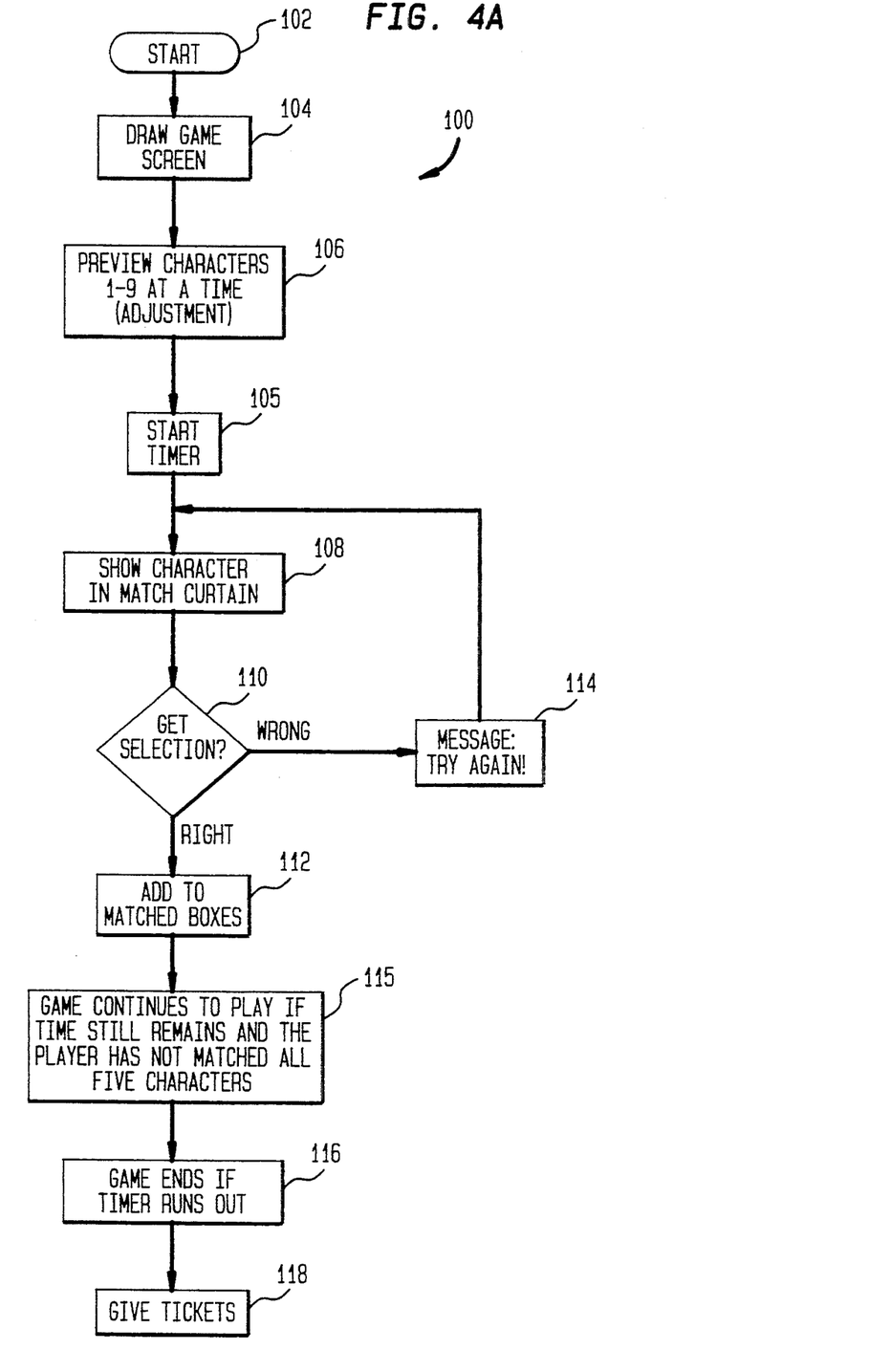
FIG. 4A is a flow diagram illustrating the basic play of the game.

FIG. 3A illustrates the initial layout of the main game screen and indicates the major elements thereof. Initially, the player 42 sees nine numbered curtains 48a (with the number "1" on it) through 48i (with the number "9" on it). Each of the nine curtained windows 48a-48i, respectively, have valances 46a-46i thereabove. On the left hand side of the video screen 28, the player 42 sees a character or symbol match curtain 35 which also has a valance 32 thereabove. Below the match curtain 35 is a field or window 39 with five boxes. The boxes progressively fill up with stars each time a player makes a correct match. Above the match curtain 35 is a timer icon 38. Details of the timer icon 38 are shown in FIG. 4G. According to the preferred embodiment, the timer icon 38 takes the form of a stopwatch having a second hand 43. As play progresses, the hand 43 sweeps clockwise across the face of the stopwatch until it goes a full 360° after which the game play is over.

Figure 4B:
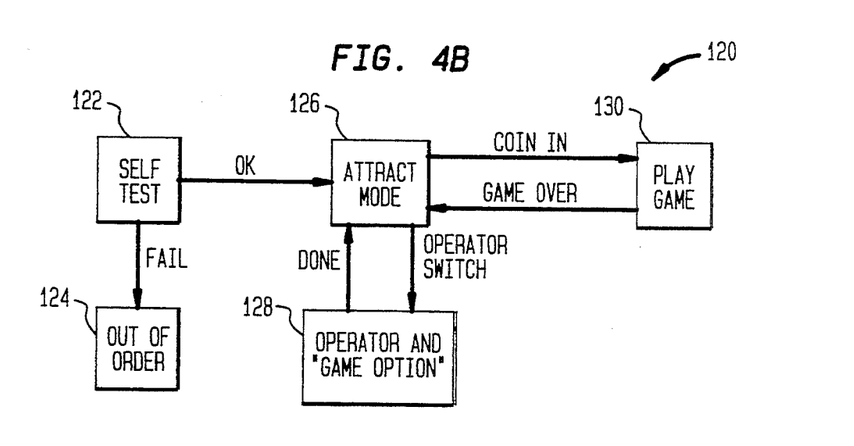
FIG. 4B is a flow diagram illustrating the relationship between the attract mode function and the other functions of the game.

Prior to actual play of the game, the invention 10 is normally in its "attract" mode as illustrated in FIG. 4B. At the beginning of the day, the arcade operator typically turns on the power switch at 90 as shown in FIG. 2 to get the machine 10 running. The operator might at this time adjust volume up and volume down switches 62 and 64, depending upon his or her best judgment. As described in FIG. 4B, the machine 10 initially enters a self-test mode on power-up as illustrated by step 122 and, if it fails, an out-of-order display 124 will be generated. If, however, the self-diagnostics are successfully completed, then the machine 10 starts its attract mode 126. Test switch 60 is used by the operator to test the game 10 through various test modes selected from an options menu 128 like the one illustrated in FIGS. 4B and 4H. This permits the operator to change certain screens and values depending upon the desired play of the game 10. Once the test menus 128 are completed, the machine receives a signal to return to the attract mode 126. Insertion of a coin or a token into slots 16A and 16B causes switches 54 and 56 to be thrown, thereby taking the game 10 out of the attract mode 126 and placing it into the game play mode 130. Once play is completed, either by successfully matching all of the character objects or when the timer icon 38 expires, the game play mode 130 signals the machine 10 to return to the attract mode 126. The foregoing steps 120 are all further described in FIG. 4B.

Figure 4C:
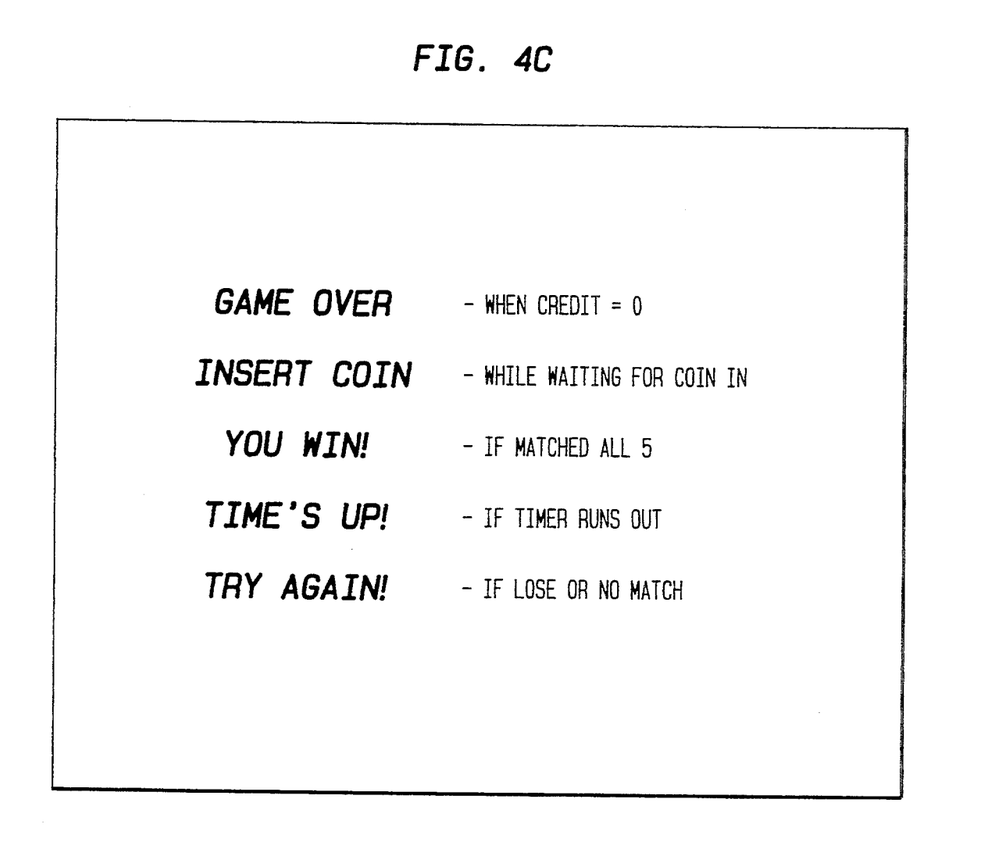
FIG. 4C illustrates the five typical verbal messages that can be delivered during play of the game.

Prior to play of the game 10, a variety of different player parameters can be adjusted to customize the play of the game 10 to the desires of the arcade or coupon redemption center operator. Some typical initial game setup steps are illustrated in FIG. 4H. The five verbal messages have previously been described with respect to FIG. 4C. The options in FIG. 4H are not necessarily representative of the options that a real operator would find on his or her machine. For example, while FIG. 4H shows a choice of "LOGO" that the operator could customize, it is more likely that the customer's logo would be set in the factory and burned into memory there rather than at the game site. The "curtain" selection allows the operator to choose three different parameters for curtain operation. In a first mode all curtains raise and lower at once; in a second mode only three windows are uncovered at one time; and, in a third mode, the machine randomly decides to uncover two windows at a time, or three windows at a time, or all windows at once. Perhaps the most important feature of the game 10 is the "Timer" which allows the operator to change the game time from 20 to 60 seconds in 5 second intervals. Therefore, the major adjustments that can be made by the operator prior to play of the game 10 are: changes to the attract mode sounds; the sound volume; the ticket payout and credits indicating the number of tickets sold per day and the profitability of the machine; the game time (in 5 second intervals from 20 to 60 seconds); and, the curtain mode (generally there are three modes of curtain opening available). If the operator does not choose to customize the game 10 by making the adjustments just described, he or she can default to factory settings built into the game 10. Under normal circumstances, the factory settings provide for a 30 second game play.

A typical game sequence is played as follows:

The game 10 is started (taken out of the attract mode) when a coin is dropped into either coin slot 16a or 16b. Next, the play screen is drawn as shown in FIG. 3A. Depending on what curtain preview mode the arcade operator has previously selected under the game setup menu, the curtains 48 will open to reveal (Preview) the characters 36 behind them one at a time, three at a time, or all nine at a time. When previewing the characters 36, either one at a time or three at a time, the sequence chosen is not fixed, rather, it is randomly generated each time the game play is initiated. This makes the game 10 less predictable and requires greater attention from the player 42. The random sequence is chosen such that either one or three characters 36 are shown at a time until what is behind all nine of the curtains 48 has been previewed.

After all the curtains 48 have been previewed, the game 10 randomly selects a character 36 and displays it in the clue box window 32, accompanied by prompting phrases in that characters' voice. Such phrases as "Can you find me?" or "Where am I?" would be typical. At this point, the timer 38 begins to decrement. The timer 38 is now running independent of game play and can time out at any point in game play hereafter. If the timer 38 times out at any point during game play, it causes the game 10 to immediately end. The amount of time given to the play 42 is adjustable by the arcade operator from the game setup menu in 5 second intervals in a range of 20 seconds to 60 seconds.

Next, the player 42 selects and presses one of the nine buttons (40a–40i) that correspond with the curtain 42 he believes the matching character is behind.

If the player 42 has correctly matched the character 36, the character 36 will praise the player 42 in that character's voice using such phrases as "Can't hide from you!" and "You found me!". The character 36 also goes through a "happy" animation sequence, and the player 42 is awarded a star in one of the five matched boxes 41 as shown in FIG. 3D, for example.

If the player 42 has incorrectly matched the character 36, the character 36 responds with an encouraging phrase such as "Try again" and goes through a "disappointed" animation routine. The player also incurs a time penalty of two seconds for the incorrect guess.

What happens next in the game sequence depends on what has happened previously in the game 10. If the player 42 has correctly matched five characters 36, game play ends, even if there is still time remaining on the timer 38. If there is still time on the timer 38 and the player 42 just correctly matched a character 36, but has not matched five characters 36 correctly, the game 10 will return to the game play sequence with no time penalty. If the player 42 has incorrectly matched the character 36, and the two second time penalty has elapsed, the curtain 48 of the incorrectly matched character 36 is closed and game play continues.

When the game 10 ends, the player 42 is given a reward in the form of tickets 24. The number of tickets 24 given depends on how many correct matches the player 42 made during the game 10. The exact number of tickets 24 given depends on how the "pay table" has been set up by the arcade operator. The pay table can be changed from the game setup menu to give any number of tickets 24 per correct match. In any case, the more correct matches the player 42 makes, the greater the reward that is given.

After the game 10 has dispensed the tickets 24 to the player 42, the game 10 returns to the "attract mode".

The following is a more detailed description of the play of the game. After the player 42 places a coin or token in the slot 16a or 16b, the switches 54 and/or 56 signal the microprocessor card 52 to switch from the attract mode 126 to the game play mode 130 as illustrated in schematic 120 of FIG. 4B. The flow diagram 100 illustrated in FIG. 4A shows the operation of game play after that point.

Figure 3B:
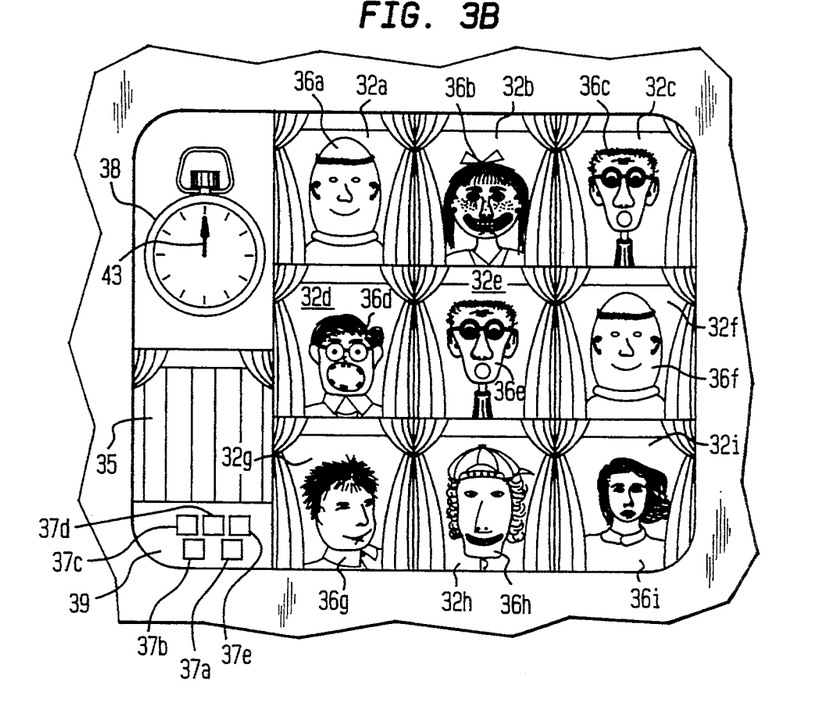
FIG. 3B illustrates the video screen at the beginning of play wherein randomly selected symbols or character objects are located on a tic-tac-toe grid.

Shortly after the game 10 enters the play mode 130, an audio message is generated saying "WATCH CLOSELY" in order to reinforce the importance of concentrating on the display on screen 28. Then, the nine curtains 48a–48i withdraw to respectively reveal game characters or icons 36a–36i for a short period of time. Preferably, all nine curtains 48a–48i withdraw at once, but other combinations of curtains can open or close depending upon the "CURTAIN" mode selected by the operator from menu 128 illustrated in FIGS. 4B and 4H. The time during which the characters 36a–36i are revealed is variable and typically might be between 1–5 seconds with a preferred exposure time of about 2 seconds. While there are nine squares or windows 32a–32i arranged in a tic-tac-toe fashion of three rows and three columns, it will be appreciated that less than nine characters 36a–36i may be illustrated because of duplicates. As illustrated in FIG. 3B, there are only seven different characters because characters 36a and 36f are the same as are 36c and 36e. During this first stage of the play, the clue curtain 35 remains closed.

Figure 4D:
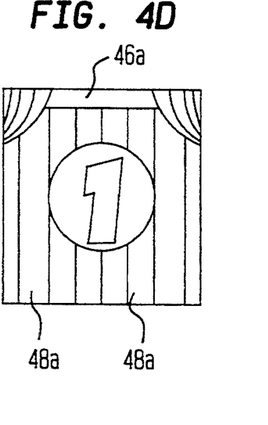
FIG. 4D is a detail of a typical window of the CRT tic-tac-toe grid with the screen closed.
Figure 4E:
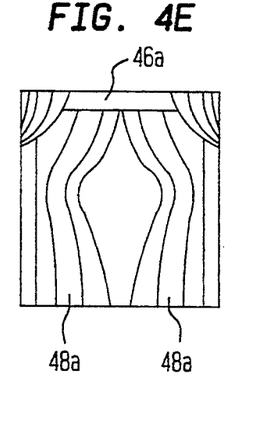
FIG. 4E illustrates a typical window just as the curtain begins to open.
Figure 4F:
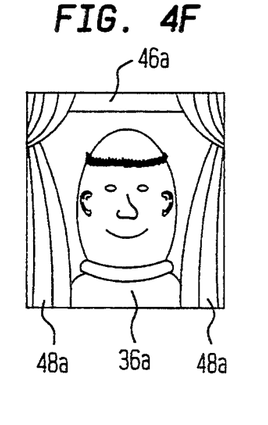
FIG. 4F is a detail illustrating a window with the curtain fully opened.
Figure 4G:
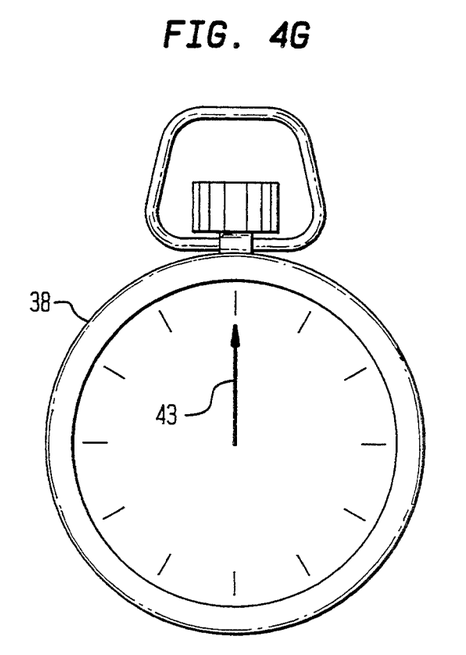
FIG. 4G is a detail illustrating the manner in which the timer displays elapsed time.
Figure 4H:
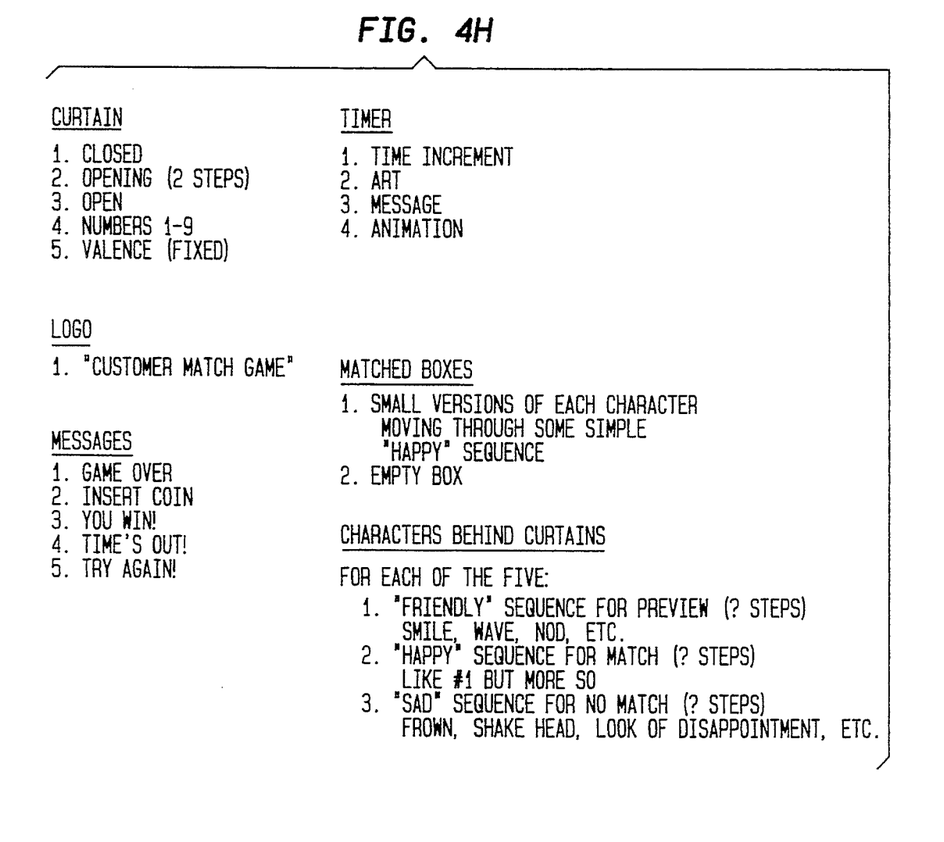
FIG. 4H is a table illustrating many of the options an operator would have at his or her disposal to change various parameters of the game, but is not necessarily meant to represent the only way the game can be set up.

FIGS. 4D–4F are details illustrating the manner in which a typical curtain 48a is withdrawn to reveal a particular game character or icon 36a. As shown in FIG. 4D, the curtain 48a, usually comprising a right and left side, is closed, revealing only the number 1. A valance 46a is always in position above the characters 36a–36i. FIG. 4E illustrates the manner in which the curtain progressively opens by means of a bulge in the middle. When the curtain 48a is fully opened, as shown in FIG. 4F, the character 36a is completely revealed.

Figure 3C:
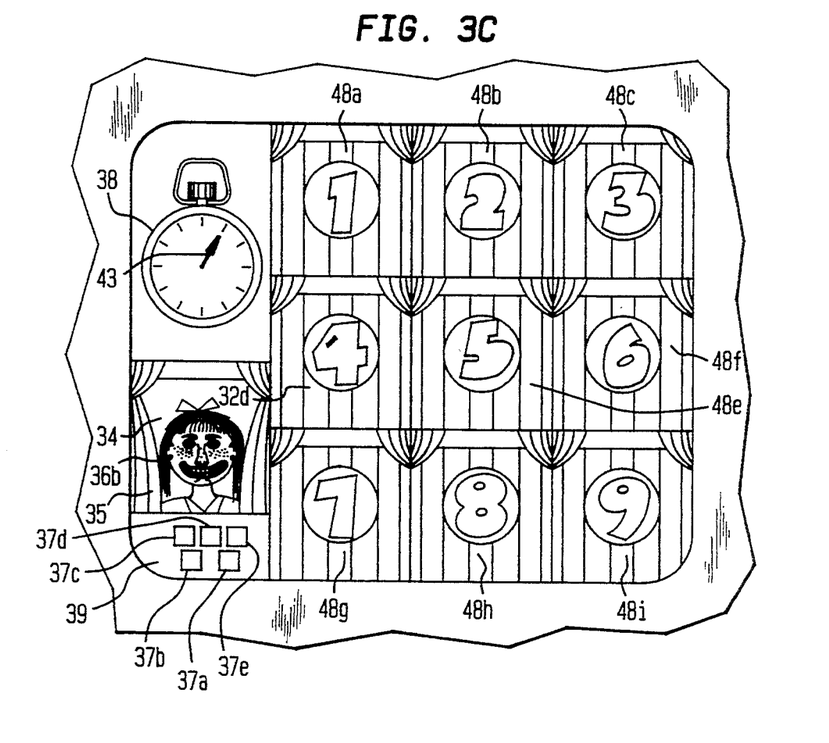
FIG. 3C illustrates the next frame in the sequence of play wherein a symbol or character object is displayed as a clue on the left hand side of the screen after the original video tic-tac-toe display has been erased.
Figure 3D:
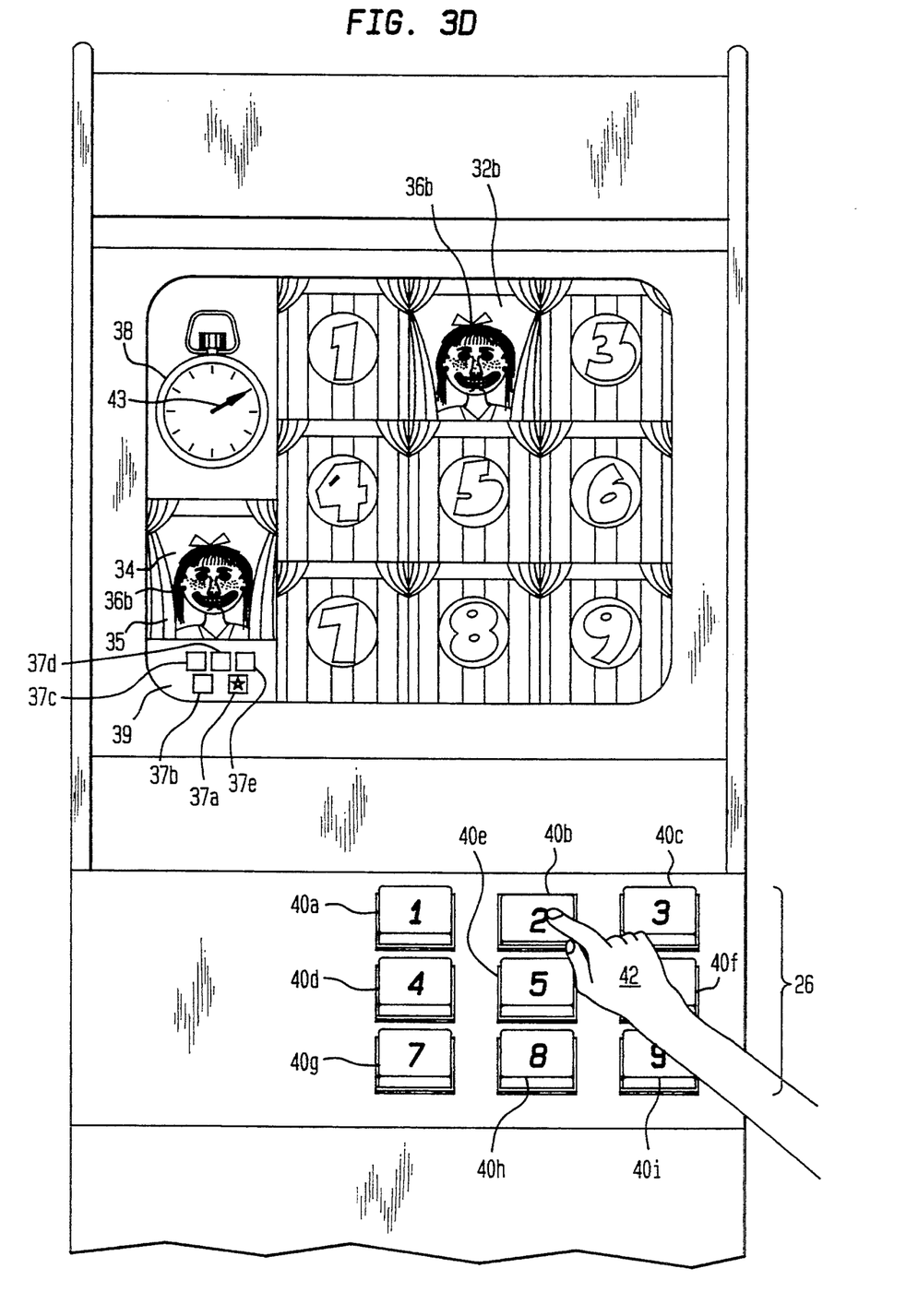
FIG. 3D illustrates the next step in the play of the game wherein the player must press one or more buttons laid out on the console to correspond to the original location of the same symbol or character object on the video screen.

The second stage of the play mode is illustrated in FIG. 3C wherein the curtains 48a–48i have again closed over windows 32a–32i so that characters 36a–36i are no longer visible. However, curtain 35, over the clue window, has been withdrawn to reveal one character 36b therein. At this stage of play, the player 42 is challenged to try to identify where he or she last saw character object 36b in the array of characters 36a–36i previously revealed in the first stage of the game illustrated in FIG. 3B.

FIG. 3D illustrates the third, or matching, step of the game 10 where the player 42, whose hand is shown in FIG. 3D, must try to match the location of the character object, symbol or icon 36b shown in match or clue window 34 with the correct relative position of the character 36b on the tic-tac-toe-like array 26 of pushbuttons 40a–40i. Depressing pushbuttons 40a–40i corresponds to selecting the characters 36a–36i behind a given curtain 48a–48i. As shown in FIG. 3D, the players hand 42 has correctly chosen button 40b, causing curtain 48b to part and reveal the selection to the player 42. The correct match results in star being placed in a "CORRECT MATCH" box in field 41.

Figure 3E:
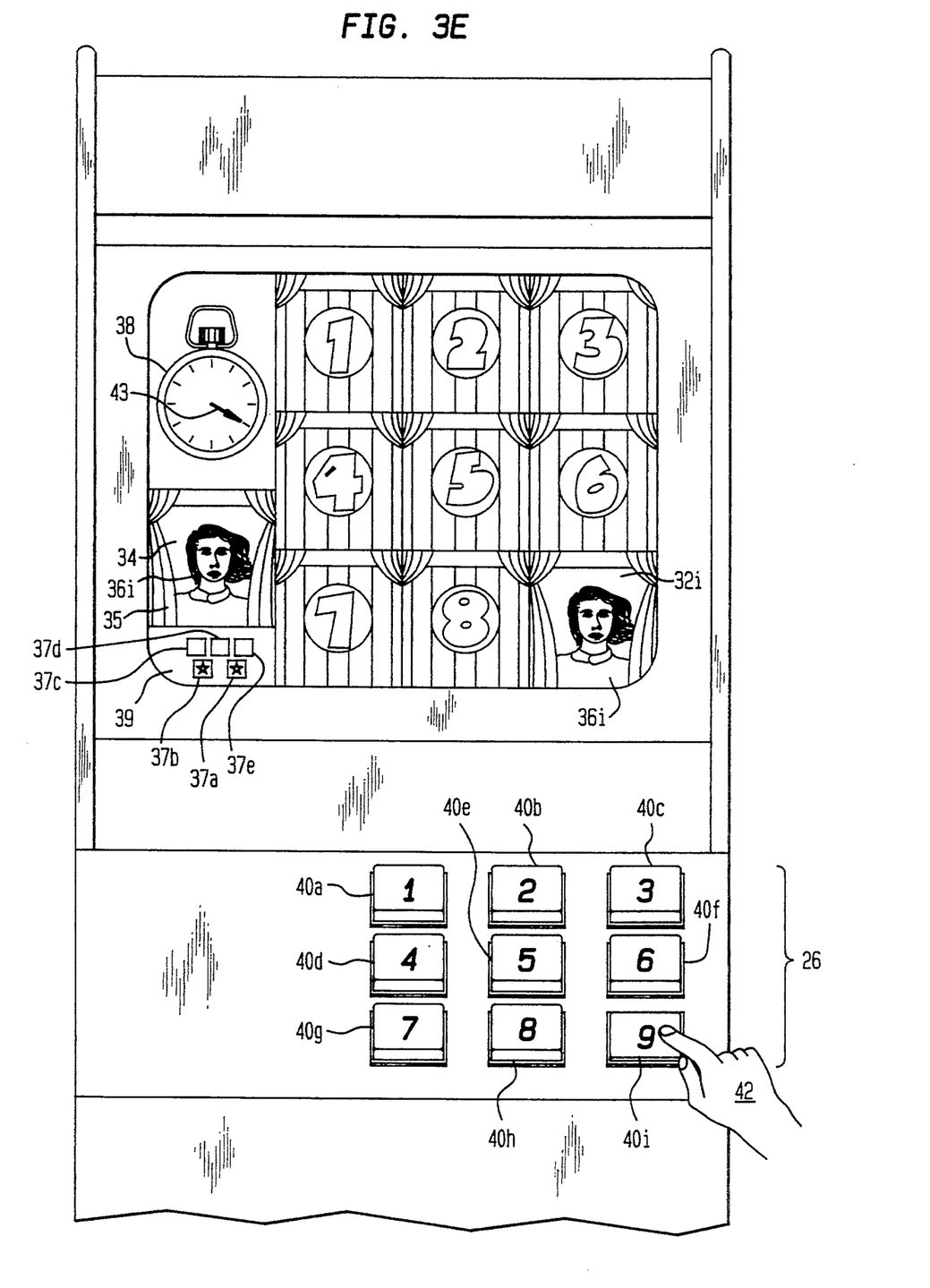
FIG. 3E illustrates the next step in the play of the game wherein the player is presented with a new symbol or character object to match.

As play continues and time moves along, second hand 43 sweeps clockwise across the face of stopwatch icon 38 to remind the player 42 that he or she has a finite time limit, perhaps 20 seconds, left from the original 30 seconds to make the remaining selections. As shown in FIG. 3E, a new character icon 36i is now displayed in clue window 34. In this case, the player 42 has again correctly selected button 40i, thereby revealing the character icon 36i in the window 32i. Because the player 42 has made a second correct choice, another star is placed in the next available "CORRECT MATCH" box in field 41.

Figure 3F:
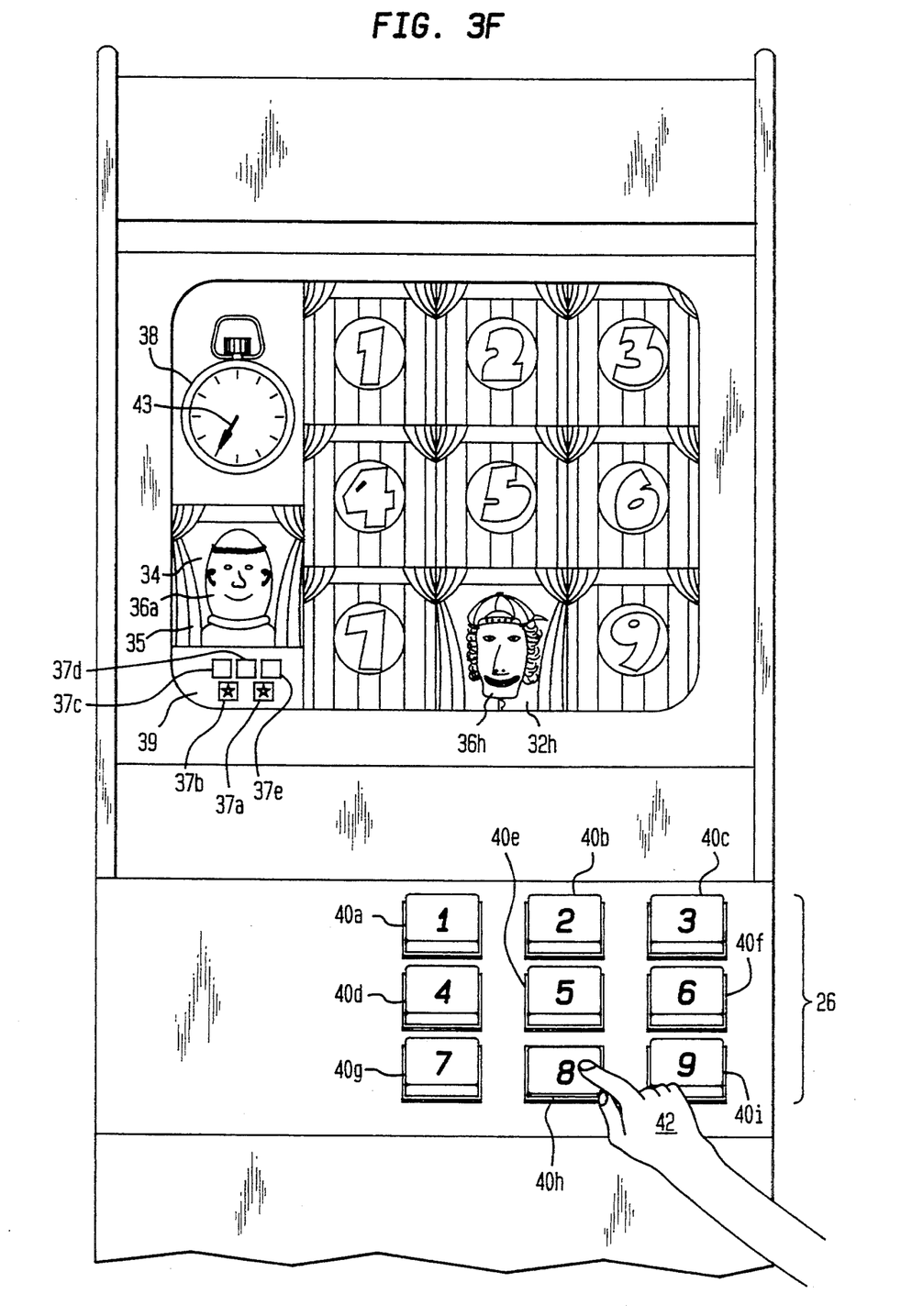
FIG. 3F illustrates a subsequent step in the game where the player has incorrectly matched a clue with a button on the console.

As play continues, the clue box window 34 reveals a third new character 36a as shown in FIG. 3F. The player 42 is shown incorrectly selecting pushbutton 40h causing window 32H to reveal a non-matching character 36h. Because the clue character 36a is not the same as the chosen character 36h, the player 42 does not get a correct match. There is a 2 second penalty delay before the player 42 can make another selection. If it weren't for the 2 second penalty delay, the player 42 could rapidly push all nine buttons 40a–40i making all the possible selections. After the 2 second delay, the player 42 will make another selection, hopefully remembering the information that he or she has accumulated from the initial revealing of the characters as shown in FIG. 3B, and through the play of the game as shown in FIGS. 3C–3F, wherein the player may have his or her memory reinforced by correct or incorrect selections. As shown in FIG. 3F, the second hand 43 of stopwatch icon 38 has swept more time off the clock indicating that time continues to pass.

Figure 3G:
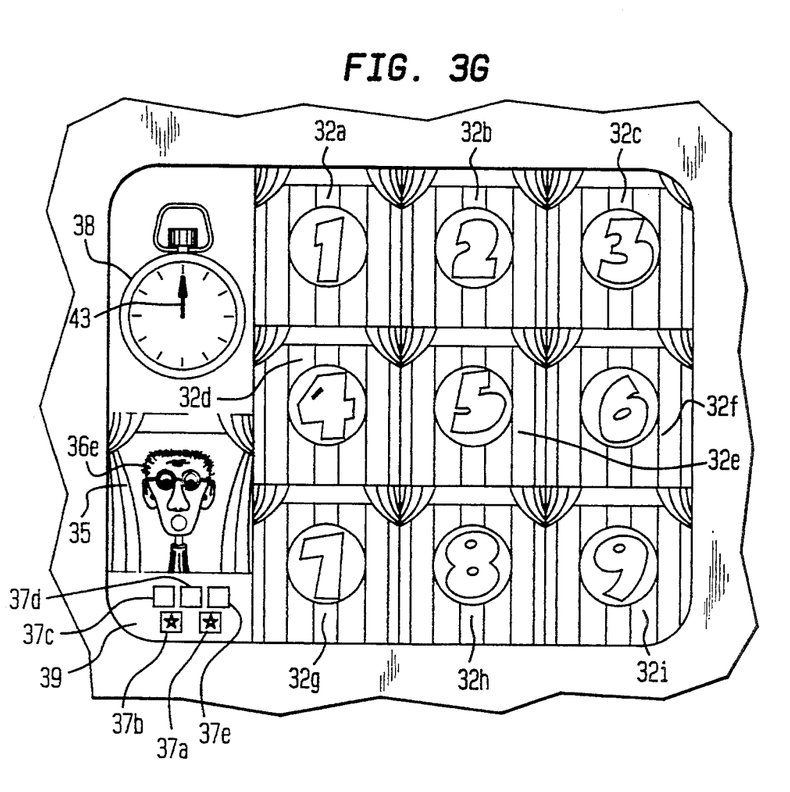
FIG. 3G illustrates the last step in the game where the player is presented with the final score.

If the player 42 makes five correct matches and fills up the matched windows 37a–37e before stopwatch 38 times out, then the player 42 wins and receives the maximum number of coupons or tickets 24 through window 22. The number of tickets 24 given depends on what the "payout table" has been set to under the operator "game options" shown in menu 128 in FIGS. 4B and 4H. It is possible to get tickets 24 with fewer than 5 correct matches. The coupons or tickets 24 may be redeemed for prizes. On the other hand, if the player 42 does not fill up all the windows 37a–37f before the 30 second time period runs out, as indicated by sweep hand 43 of timer 38, then the player 42 loses. The losing condition is illustrated in FIG. 3G where there's no time left on the timer 38 and not all of the five match boxes in field 41 have been filled up. Typically, game 10 would, at this point in time, generate the audio message "Try Again!".

FIG. 4A shows the decision sequence 100 of the play of the game 10. The start step 102 is initiated by inserting coins into the slot 16A and 16B. Next, the game characters are drawn on the screen in step 104. Subsequently, the characters 1–9 (36a–36i) are previewed and adjusted in step 106 prior to the actual play of the game 10. The 36a–36i characters can be previewed all at once as shown in FIG. 3B or individually or in groups of three depending upon the operators' setup choice. Then, as the game 10 enters its second stage or phase, as shown in FIG. 3C, the curtains 48a–48i close and a character 36b, or other character, is reviewed in the clue window 34. Next, as illustrated in FIGS. 3D–3F, the player 42 makes subsequent match selections as shown in step 110. If the player 42 makes a wrong match selection 110, he or she receives the verbal message "Try Again!" as shown by decision box 114 and is returned back to the character selection mode again after a 2 second delay. On the other hand, if the player 42 makes a correct match selection, then the correct selections are indicated by stars in the "CORRECT MATCH" boxes of field 41, as shown in step 112. The process continues as shown in step 115 until the player has either selected all the correct matches or time has run out as illustrated in step 116. If the player 42 has been successful in playing the game 10, he or she will receive tickets 24 as shown by decision box 118 or, alternatively, if the player 42 has not been successful, he or she will not receive any tickets or coupons 24 or will only receive a few tickets.

Prior to the next game, the machine 10 may randomly rearrange the sequence of characters 36a–36i to make the subsequent play of the game less predictable.

While the invention has been described with reference to the preferred embodiment thereof, it will be appreciated by those of ordinary skill in the art that modifications or changes can be made to the method and structure of the game without departing from the spirit and scope thereof.

What is claimed is:

1. A method of playing a game comprising the steps of:
   (a) previewing a plurality of different images arranged in a pre-determined pattern in a first location on a screen until all of the different images have been previewed at least once;
   (b) turning off all of said images on said screen after a first pre-determined period of time;
   (c) presenting at least one of said plurality of images on said screen at a second location different from said first location;
   (d) selecting at least one button from a plurality of buttons arranged in the same pre-determined pattern as said different images previewed in step (a) to match the position of an image presented in step (a) with the position of the corresponding image shown on said screen in step (c).

2. The method of claim 1 further comprising the step of:
   (e) repeating steps (c) and (d) above.

3. The method of claim 2 further comprising the step of:
(f) discontinuing step (e) after a second predetermined period of time.

4. The method of claim 3 wherein said predetermined pattern comprises a pattern of rows and columns.

5. The method of claim 4 further comprising the step of:
(g) scoring each successful match made in steps (d) and (e).

6. The method of claim 5 further comprising the step of:
(h) accumulating the score in step (g) to produce a final cumulative score at the end of each game.

7. The method of claim 6 further comprising the step of:
(i) randomly rearranging the location of said images in said predetermined pattern on said screen at the beginning of each new game.

8. The method of claim 7 wherein said predetermined pattern comprises a nine location tic tac toe-like grid having three rows and three columns and wherein said plurality of buttons comprise nine buttons arranged in three rows and three columns to correspond to the nine locations of said predetermined pattern on said screen.

9. The method of claim 8 wherein said game comprises a video game.

10. The method of claim 9 further comprising the step of:
(j) introducing a penalty delay comprising a third predetermined period of time between an incorrect selection of a button in step (d) and the next subsequent selection of a button in step (d).

11. The method of claim 10 further comprising the step of:
(k) awarding coupons to a player in proportion to the successful score accumulated in step (h).

12. The method of claim 11 further comprising the step of:
(1) randomly changing the sequence of images previewed in step (a) at the beginning of subsequent new games.

13. A video game comprising:
a game console;
a plurality of push buttons arranged in a first predetermined pattern on said console;
a video display screen means for displaying a plurality of character icons arranged on said screen at a first location in said first pre-determined pattern for a first pre-determined period of time and subsequently displaying a single clue character icon on said screen at a second location different than said first location, wherein all of said character icons are displayed during said first pre-determined period of time; and,
character match means for determining when a player correctly matches the clue character icon with the correctly located push button.

14. A method of playing a game comprising the steps of:
(a) previewing a plurality of different images arranged in a pre-determined pattern at a first location on a screen;
(b) turning off all of said images on said screen after a first pre-determined period of time after all of said plurality of different images have been shown at least once;
(c) presenting one of said plurality of images on said screen at a second location different than said first location;
(d) selecting at least one button from a plurality of buttons arranged in the same pre-determined pattern as the plurality of different images previewed in step (a) in order to match the image presented in step (c) with the location of the image presented in step (a);
(e) repeating steps (c) and (d) above;
(f) discontinuing step (e) after a second pre-determined period of time; and,
(g) introducing a penalty delay comprising a third predetermined period of time between an incorrect selection of a button in step (d) and the next subsequent selection of a button in step (d).

15. A method of playing a game comprising the steps of:
(a) previewing a plurality of different images arranged in a pre-determined pattern on a screen;
(b) turning off all of said images on said screen after a first pre-determined period of time after all of said plurality of different images have been previewed at least once;
(c) presenting one of said plurality of images on said screen;
(d) activating at least one button to match the image presented in step (c) with the location of the same image previously presented in step (a);
(e) repeating steps (c) and (d) above; and,
(f) discontinuing step (e) after a second pre-determined period of time.

16. A method of playing a game comprising the steps of: of:
(a) previewing at least three different images arranged in a pre-determined pattern on a screen;
(b) turning off all of said images on said screen after all of said images have been previewed at least once;
(c) presenting one of said images from step (a) on said screen as a clue image;
(d) selecting at least one button from at least three buttons arranged in the same pre-determined pattern of step (a) to match the clue image of said step (c) with the correct corresponding location of the same image previously previewed in step (a);
(e) repeating steps (c) and (d) above; and,
(f) discontinuing step (e) after a pre-determined period of time.

17. A video game comprising:
a game console;
at least three push buttons arranged in a first pattern on said console;
a video display screen means for displaying a plurality of character icons arranged on said screen in the same pattern as the push buttons are arranged on said console until all of said character icons have been displayed at least once and then subsequently displaying a single clue character icon on said screen; and,
character match means for determining when a player correctly matches the clue character icon with the correctly located push button.

* * * * *